Patented Mar. 29, 1938

2,112,292

UNITED STATES PATENT OFFICE 2,112,292

PROCESS FOR RECOVERY OF CATALYTICALLY ACTIVE MOLYBDENUM SULPHIDE

William H. Jones, Baton Rouge, La., assignor to Standard-I. G. Company

No Drawing. Application December 13, 1935, Serial No. 54,264

9 Claims. (Cl. 23—238)

This invention relates to an improved method for the preparation of a sulphide of molybdenum in an active form suitable for catalyzing hydrogenation reactions such as the high pressure destructive hydrogenation of carbonaceous materials including petroleum and fractions thereof. It relates more particularly to an improved process for recovering catalytically active molybdenum trisulphide from spent hydrogenation catalysts containing molybdenum.

Various methods have been suggested for the recovery of molybdenum from spent hydrogenation catalysts. Such methods usually involve the formation of complex compounds containing molybdenum and ammonium radicles and require the use of substantial quantities of ammonia or compounds thereof. An improved method has now been discovered whereby highly active molybdenum compounds may be recovered from such spent catalysts in a much more simple and direct manner. The following example is presented to illustrate a preferred modification of this invention and is not in limitation thereof:

Example 1

A spent hydrogenation catalyst containing oxides and sulphides of molybdenum, zinc and magnesium, and also occluded impurities such as iron sulphide and tarry or pitchy matter, was roasted in air at a temperature of 1100° to 1200° F. until substantially all carbonaceous material was removed. The roasted mass was then digested with hot concentrated sulphuric acid until it was almost entirely dissolved. The resulting solution was separated from undissolved matter by decantation and was then diluted with water to a final sulphuric acid strength of about 10 to 20%. Hydrogen sulphide was then passed through the solution until it became saturated and no additional precipitation was observed. The precipitate, consisting of molybdenum trisulphide, was separated from the solution by filtration, which was conducted in an inert atmosphere such as nitrogen, in order to avoid oxidation of the precipitate. The molybdenum trisulphide was then carefully dried in an inert or reducing atmosphere and was available for immediate use as a highly active hydrogenation catalyst.

The roasting treatment is preferably conducted at a temperature below about 1400° F. in order to avoid undue losses of molybdic oxide by sublimation.

While the molybdenum trisulphide thus recovered may be used alone, it may also be mixed with various promoters such as oxides and/or sulphides of metals of groups 2 to 7 of the periodic system. It may also be reduced partially or completely to molybdenum disulphide by any suitable means as by heating in a reducing gas such as hydrogen at a suitable reduction temperature of the order of 850° F. to 950° F. Catalysts suitable for use in lump form as fixed or stationary catalysts in a continuous process for the treatment of hydrocarbon fluids may be prepared by compressing molybdenum trisulphide or the reduced molybdenum disulphide into tablets or small briquettes of any desired size and shape by compression in suitable molds. Pressures of the order of 10,000 pounds per square inch are suitable for this purpose. A preferred method of preparation of strong and rugged tablets is to grind the molybdenum sulphide, or mixture containing it, to a fine powder of the order of 10 to 100 mesh. This is then compressed into tablets, which are crushed and again ground, to pass a 100 mesh screen. This powder is then recompressed into tablets. This grinding and retabletting may be repeated one or more times. Such tablets may also be prepared from mixtures containing an active sulphide of molybdenum and any suitable promoters, fillers or extending materials, as are commonly used in the preparation of hydrogenation catalysts.

In the above example, hot concentrated sulphuric acid was used for digesting the roasted catalyst mass in order to secure substantially complete solution in a short time. Any acid capable of dissolving the molybdic oxide can be used but sulphuric acid of about 50% strength is generally preferred. It has been found desirable to dilute the resulting acid solution sufficiently to avoid any oxidizing tendencies of the acid. The acid strength is preferably reduced to below about 20% by this dilution. Care should be taken, however, not to dilute to so great an extent as to cause the precipitation of sulphides of other metals which may be present, such as zinc sulphide, during the subsequent precipitation of molybdenum trisulphide.

The precipitation of molybdenum trisulphide may be accomplished by the addition of any suitable precipitating agent such as ammonium or alkali metal sulphides or poly-sulphides. Care should be taken to maintain the solution definitely acid during the addition of such agents to prevent the precipitation of sulphides of other metals than molybdenum which are insoluble in substantially neutral or alkaline media.

These catalysts are especially suited for the treatment of mineral oils with hydrogen at high pressures of the order of 20, 50, 100, 200 atmospheres and higher, and at temperatures above about 600° F. and preferably between about 700 and 900° F., although they may also be used at higher temperatures. They are particularly effective in hydrofining operations and in the improvement of the viscosity index of lubricating oils and generally in operations involving treatment of petroleum oils with hydrogen under suitable conditions of temperature and time of treatment, to secure desulphurization and refining of the oil with a limited destructive or cracking action so that not more than about 20% of lower boiling products, boiling in the range used for motor fuels, are formed.

This invention may also be used to prepare molybdenum trisulphide in a form having high catalytic activity, especially in the hydrogenation of carbonaceous materials such as mineral oils, from other sources of molybdenum in addition to the spent catalysts described herein. For example, crude molybdic acid may be dissolved directly in the strong mineral acid solutions shown above. Other compounds of molybdenum are preferably first roasted before being treated with acid.

This invention is not to be limited by any specific examples, which have been presented solely for purpose of illustration, but is limited only by the following claims in which it is desired to claim all novelty insofar as the prior art permits.

I claim:

1. Process for the preparation of an active hydrogenation catalyst from a compound of molybdenum which comprises roasting the said compound to the oxide, digesting the roasted mass with a concentrated acid solution capable of dissolving molybdic oxide, separating the resulting solution from any undissolved residue, adjusting the acid strength of said solution to be substantially non-oxidizing to hydrogen sulphide, passing hydrogen sulphide through said solution to precipitate molybdenum trisulphide, and separating said precipitated molybdenum trisulphide from the remaining acid solution.

2. Process for the preparation of an active hydrogenation catalyst from molybdenum trioxide which comprises dissolving the said oxide in sulphuric acid of above about 50% strength, adding water to the resulting acid solution to reduce its sulphuric acid content to below about 20%, passing hydrogen sulphide through the diluted acid solution to precipitate molybdenum trisulphide therefrom and separating said molybdenum trisulphide from said remaining acid solution.

3. Process for the preparation of an active hydrogenation catalyst from spent hydrogenation catalysts containing molybdenum which comprises roasting the spent catalyst at a temperature below about 1400° F. and for a time sufficient to remove substantially all carbonaceous material therefrom, digesting the roasted mass with concentrated sulphuric acid solution capable of dissolving molybdic oxide, separating the resulting solution from any undissolved residue, adjusting the acid strength of said solution to be substantially non-oxidizing to hydrogen sulphide, passing hydrogen sulphide through said solution to precipitate molybdenum trisulphide, and separating said precipitated molybdenum trisulphide from the remaining acid solution.

4. Process for the preparation of an active hydrogenation catalyst from spent hydrogenation catalysts containing molybdenum which comprises roasting the spent catalyst at a temperature below about 1400° F. and for a time sufficient to remove substantially all carbonaceous material therefrom, dissolving the roasted mass in sulphuric acid of above about 50% strength, adding water to the resulting acid solution to reduce its sulphuric acid content to below about 20%, passing hydrogen sulphide through the diluted acid solution to precipitate molybdenum trisulphide therefrom and separating said molybdenum trisulphide from said remaining acid solution.

5. Process according to claim 9, in which said precipitated molybdenum trisulphide is separated from said solution in a non-oxidizing atmosphere.

6. Process according to claim 9, in which said heating step comprises heating said catalyst in air to a temperature above about 1000° F.

7. Process according to claim 9, in which the acid precipitation step is conducted in a solution containing from 10 to 20% of sulphuric acid.

8. In a process for the treatment of carbonaceous materials with free hydrogen at elevated temperatures and pressures in the presence of a hydrogenation catalyst comprising a sulphide of molybdenum in which said catalyst has undergone a decrease in activity, an improvement for recovering said sulphide of molybdenum in a catalytically active form comprising heating said catalyst in an oxidizing atmosphere to a temperature below 1400° F. and for a time sufficient to remove substantially all carbonaceous material therefrom, dissolving said heated catalyst in sulphuric acid of above about 50% strength, adjusting the acid strength of the resulting solution to be substantially non-oxidizing to hydrogen sulphide, then adding hydrogen sulphide to the diluted acid solution to precipitate molybdenum trisulphide therefrom, separating said precipitated molybdenum trisulphide from the remaining acid solution and re-using the resulting regenerated catalyst in the said hydrogenation process.

9. In a process for the treatment of carbonaceous materials with free hydrogen at elevated temperatures and pressures in the presence of a hydrogenation catalyst comprising a sulphide of molybdenum in which said catalyst has undergone a decrease in activity, an improvement for recovering said sulphide of molybdenum in a catalytically active form comprising heating said catalyst in an oxidizing atmosphere to a temperature below 1400° F. and for a time sufficient to remove substantially all carbonaceous material therefrom, dissolving said heated catalyst in sulphuric acid of above about 50% strength, adding water to the resulting acid solution to reduce its sulphuric acid content to below about 20%, then precipitating molybdenum trisulphide from said acid solution, separating said precipitated molybdenum trisulphide from the remaining acid solution, and re-using the resulting regenerated catalyst in the said hydrogenation process.

WILLIAM H. JONES.